(12) United States Patent
Bizjak

(10) Patent No.: US 9,369,030 B2
(45) Date of Patent: Jun. 14, 2016

(54) DYNAMO-ELECTRIC MACHINE

(71) Applicant: KOLEKTOR GROUP D.O.O., Idrija (SI)

(72) Inventor: Franc Bizjak, Idrija (SI)

(73) Assignee: KOLEKTOR GROUP D.O.O., Idrija (SI)

( * ) Notice: Subject to any disclaimer, the term of this patent is extended or adjusted under 35 U.S.C. 154(b) by 315 days.

(21) Appl. No.: 14/139,144

(22) Filed: Dec. 23, 2013

(65) Prior Publication Data

US 2014/0184016 A1 Jul. 3, 2014

Related U.S. Application Data

(63) Continuation of application No. PCT/EP2012/002026, filed on May 11, 2012.

(30) Foreign Application Priority Data

May 11, 2012 (DE) .......................... 10 2011 105 759

(51) Int. Cl.
*H02K 13/00* (2006.01)
*H01R 39/10* (2006.01)

(52) U.S. Cl.
CPC .............. *H02K 13/003* (2013.01); *H01R 39/10* (2013.01)

(58) Field of Classification Search
CPC ............................. H01R 39/10; H02K 13/003
USPC ......................................... 310/232, 251, 246
See application file for complete search history.

(56) References Cited

U.S. PATENT DOCUMENTS 2,623,188 A 12/1952 Tourneau et al.
2,774,898 A 12/1956 Tourneau
(Continued)

FOREIGN PATENT DOCUMENTS

DE 358226 A 9/1922
DE 973236 B 12/1959
(Continued)

OTHER PUBLICATIONS

International Search Report for corresponding application PCT/EP2012/002026 mailed Aug. 29, 2012.

*Primary Examiner* — Alex W Mok
(74) *Attorney, Agent, or Firm* — Myers Wolin, LLC

(57) ABSTRACT

A dynamo-electric machine is provided comprising a stator and a rotor assembly which is rotatably mounted relative to the stator and which has a rotor shaft. The rotor assembly also has a rotor winding through which current flows and which is connected to terminals associated with the stator in an electrically conductive manner without interruption via a slip ring arrangement. The slip ring arrangement comprises at least two pairs of slip rings, each pair having a stator slip ring and a rotor slip ring that permanently rest against each other in a ring-shaped non-cylindrical contact zone. The two rotor slip rings are arranged between the two stator slip rings. Furthermore, each rotor slip ring is arranged on a rotor support disk that is rotationally fixed to the rotor shaft. The position of the two stator slip rings can be changed relative to each other in the axial direction.

17 Claims, 1 Drawing Sheet

(56) References Cited

U.S. PATENT DOCUMENTS

| | | | |
|---|---|---|---|
| 2,797,273 A * | 6/1957 | Brodsky | B60C 23/0467 200/61.26 |
| 2,981,916 A * | 4/1961 | O'Brien | H01R 39/08 310/232 |
| 3,396,586 A | 8/1968 | Maclin et al. | |
| 4,047,063 A * | 9/1977 | Reece | H01R 39/30 310/209 |
| 4,189,702 A * | 2/1980 | Maloy | G01S 7/521 310/232 |
| 4,275,376 A | 6/1981 | Alexander et al. | |
| 4,334,159 A * | 6/1982 | Ooki | H02K 9/28 310/227 |
| 4,346,321 A * | 8/1982 | Frister | H01R 39/14 310/232 |
| 4,372,633 A * | 2/1983 | Allen | H01R 39/64 310/232 |
| 4,410,821 A * | 10/1983 | Kurt | H01R 39/08 310/227 |
| 5,281,880 A * | 1/1994 | Sakai | H02K 23/60 192/48.2 |
| 5,285,125 A * | 2/1994 | Lang | H02K 17/22 310/232 |
| 7,307,367 B2 * | 12/2007 | Angerpointner | H01R 43/10 310/232 |
| 7,417,353 B2 | 8/2008 | Wada et al. | |
| 2005/0127777 A1 | 6/2005 | Kashihara et al. | |
| 2007/0257577 A1 * | 11/2007 | Bizjak | H01R 39/14 310/232 |
| 2008/0111440 A1 * | 5/2008 | Schilling | H02K 9/28 310/228 |
| 2012/0200194 A1 * | 8/2012 | Schwery | H02K 13/006 310/227 |

FOREIGN PATENT DOCUMENTS

| | | |
|---|---|---|
| DE | 2926294 A1 | 1/1981 |
| DE | 3418504 A1 | 11/1984 |
| DE | 4430073 A1 | 2/1996 |
| DE | 10113673 A1 | 10/2001 |
| DE | 202010002327 U1 | 6/2011 |
| EP | 0671802 A1 | 9/1995 |
| EP | 1311051 A2 | 5/2003 |
| EP | 1337013 A2 | 8/2003 |
| GB | 1138526 A | 1/1969 |
| GB | 2140984 A | 12/1984 |
| WO | 9701200 A1 | 1/1997 |

* cited by examiner

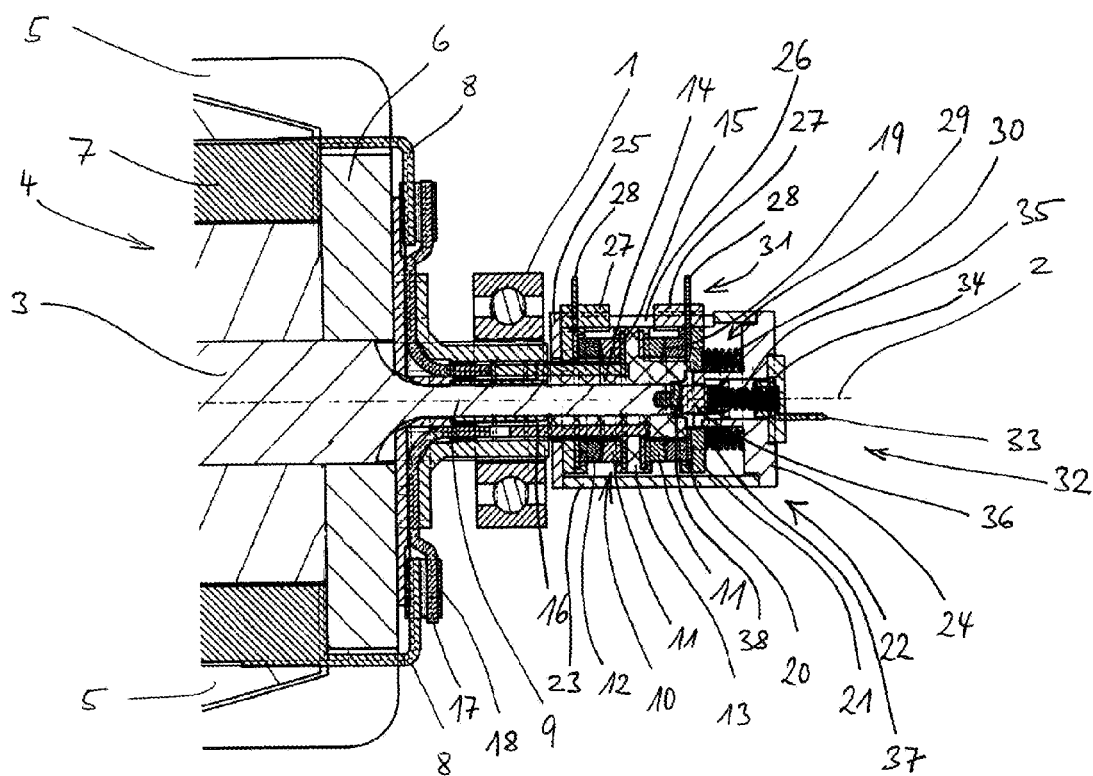

DYNAMO-ELECTRIC MACHINE

CROSS REFERENCE TO RELATED APPLICATIONS

This is a continuation of PCT/EP2012/002026, filed May 11, 2012, which claims priority to DE Application 10 2011 105 759.9, filed Jun. 24, 2011, the contents of each of which are incorporated by reference in their entireties.

FIELD OF THE INVENTION

This invention relates to a dynamo-electric machine, particularly a vehicle generator, with a stator and a rotor which is rotatably mounted relative to said stator and which has a rotor shaft. The rotor comprises a rotor winding through which a current flows and which is connected with terminals associated with the stator in an uninterrupted electrically conductive manner via a slip ring arrangement.

BACKGROUND

Vehicle generators primarily addressed by this invention are typically fashioned as claw pole inductor-alternator machines. The current induced during the rotor rotation in the rotor winding is typically conducted to two cylindrical slip rings mounted at the end of the rotor shaft and connected with the rotor winding. From there, the current is fed via so-called "brushes" to a rectifier and regulator arrangement. Such a normal generator construction is described in diverse publications such as, for example, in DE 10113673 A1, DE 4430073 A1, EP 1311051 A2, EP 671802 A1, US 2005/0127777 A1, EP 1337013 A2 and U.S. Pat. No. 7,417,353 B2. With reference to the transmission of the current induced in the rotor winding to the stator, alternatives have already been suggested, yet without commercial success, such as, for example, in GB 1138526 a transmission by means of a "slip ring arrangement" with planar brush running surfaces with a first central contact zone and a second contact zone surrounding it in a circular form. In DE 2926294 A, the transmission is accomplished by means of two rotor slip rings with planar contact faces that are arranged on both sides of a carrier; they each abut a brush axially. For the current transmission between rotor and stator of an electrical machine, a slip ring arrangement was suggested where a rotor slip ring permanently contacts an axially opposite stator slip ring (DE 973236). An axial slip ring arrangement for current transmission in dynamo-electric machines is also described in U.S. Pat. No. 2,623,188.

Slip ring arrangements as such are otherwise known not only for the transmission of current induced in the rotor windings to the generator stator but also in connection with signal transmission. Such a slip ring arrangement serving signal transmission is, for example, found in U.S. Pat. No. 4,275,376.

Slip ring arrangements for the transmission of electrical signals and/or power are also the subject of DE 20 2010 002327. For a slip ring arrangement consisting of two pairs of slip rings, an alternating sequence of rotor and stator slip rings is suggested, i.e., the sequence of first rotor slip ring, first stator slip ring, second rotor slip ring, second stator slip ring together with the corresponding support structure. The stack of four slip rings is arranged and secured between a rotor collar and a shaft nut screwed on the rotor.

It is suggested for a slip ring arrangement consisting of at least three pairs of slip rings that two opposing slip rings each be arranged at adjacent rotor slip ring supports and stator slip ring supports. This results in the sequence first stator slip ring, first and second rotor slip ring, second and third stator slip ring, third rotor slip ring.

Despite diverse attempts of optimizing dynamo-electric machines of the initially described type in relation to the connection of the current-carrying rotor winding to the stator, there is still a demand for a practical, commercially realizable solution that offers a long-lasting, reliable, cost effective and compact dynamo-electric machine of the above mentioned type.

SUMMARY

This task is accomplished by this invention through a dynamo-electric machine, particularly a vehicle generator, with a stator and a rotor which is rotatably mounted to said stator, wherein the rotor has a rotor shaft and comprises a rotor winding through which current flows and which is connected with terminals associated with the stator in an uninterrupted electrically conductive manner via a slip ring arrangement. The slip ring arrangement comprises at least two pairs of slip rings, each pair having a stator slip ring and a rotor slip ring that permanently rest against each other in a ring-shaped non-cylindrical contact zone. The slip ring arrangement consists of exactly two pairs of slip rings, each slip ring pair comprises a stator slip ring and a rotor slip ring; the stator slip ring and the corresponding rotor slip ring abut each other permanently in a ring-shaped contact zone in the form of a truncated cone; the two rotor slip rings are arranged between the two stator slip rings; each rotor slip ring is arranged on a rotor support disk that is connected to the rotor shaft in a rotational proof manner. The position of the two stator slip rings can be changed relative to each other in axial direction.

The dynamo-electric machine, therefore, excels through numerous specific specialties that are combined and work functionally with each other; their interaction accomplishes the desired result, namely a long-lasting, economical, reliable and compact dynamo-electric machine. The comparably large contact zones available for the current transmission between rotor and stator result in a comparably low electric flow density; this, in turn, reduces or eliminates, respectively, thermal problems in the current state of the art. Also, wear and tear problems are alleviated by this invention resulting in a correspondingly high longevity. The permanent contact of one stator slip ring each with a rotor slip ring in the area of a non-cylindrical ring-shaped contact zone is also contributing, as opposed to the widely used state of the art that uses brushes to equalize the current flow, because there are no internal resistances that change during the rotor rotation. In addition, mechanical rotor vibrations, as they can occur especially after longer operating times due to fatigued bearings, remain largely inconsequential for the current transmission quality. The concentration of the compensation for wear, by allowing that the position of the two stator slip rings can be changed relative to each other in an axial direction, into the stator renders any rotational compensation for wear superfluous. The arrangement of the two rotor slip rings between the two stator slip rings enables the realization of an especially compact construction as well as a functionally especially simple compensation for wear. Additional advantages of the electrodynamic machine of this invention will be understood by the following description and explanation of particular preferred developments and embodiments.

Within the framework of this invention, the ring-shaped contact zones in the form of truncated cones existing each between one rotor slip ring and its corresponding stator slip ring can be designed in different ways. In a first embodiment of the invention, the double taper angle of the contact zones measures between 170° and 140°. In this case, possible adverse effects caused by rotor vibrations (see above) do not negatively affect the quality of current transmission to any notable extent. In this case, too, the enlargement of the axial construction length of the slip ring arrangement, compared with planar contact zones, is negligible, and in any case very minor.

Another preferred embodiment provides that the contact zones of the two slip ring pairs are implemented identically, i.e., that they are in particular located on the same radius. Especially favored is the arrangement of the contact zones of the two slip ring pairs—with the contact zones in a truncated cone arrangement—in an orientation to each other as mirror images. Considering the vibration dynamics, it is especially expedient when the contact zones are constructed as truncated cones and the tapers on which the contact zones are resting are standing opposite each other with their tips. The distance of the tips of said tapers to one another should be in the range of approximately 0.5 to 2 fold of the medial radius of the contact zones.

The rotor support disk/s is/are preferably made of an electrically insulating material. Especially when the rotor slip rings are made of graphite (see below), they are preferably connected via a metal rotor connection disk with the rotor support disk. The rotor connection disk is again especially preferably connected with a terminal that extends essentially parallel to the rotor axis and can be installed especially in a slot extending parallel to the rotor axis inside the rotor shaft. Said terminals are preferably contacted at their ends with the rotor winding via end clamps. Within the pertinent contact zone, the terminals and the ends of the rotor winding extend preferably toward one another in radial direction. This is favorable for minimizing the effects of centrifugal forces on the contacting of the terminals with the rotor winding.

Still another especially preferred embodiment of the invention is characterized by a joint rotor support disk on which the two rotor slip rings are arranged on two opposing front sides. The attachment of the two rotor slip rings on a joint rotor support disk contributes to the minimization of the axial construction length of the slip ring arrangement. The common rotor support disk can protrude in radial direction toward the outside from a sleeve-type component which can be slid onto the rotor shaft and which is rotationally and axially secured on it.

It was mentioned above that the rotor slip rings preferably consist of graphite material. The stator slip rings are also preferably made of graphite material. It is especially favorable when the rotor slip rings and the stator slip rings are made of different graphite material where the respective material pairing is optimally aligned with the operating behavior, the abrasion behavior and the current transmission behavior. Depending on the individual material pairing, it can be favorable when the contact zones are wet; this can be realized when the rotor slip rings and/or the stator slip rings are immersed in wetting fluid. Said wetting fluid is held in a housing surrounding the slip ring arrangement.

Such a housing surrounding the slip ring arrangement is used in another preferred embodiment of the invention for the mounting of the stator slip rings, especially when each stator slip ring is rigidly connected with an associated stator support disk, which stator support disks are rotation proof mounted in a housing surrounding the slip ring arrangement. Said stator support disks can be preferably made of an insulating material while the stator slip rings preferably are each connected with a dedicated stator support disk, each having a terminal point, via a metallic stator connector disk.

With respect to wear and tear compensation, at least one of the stator support disks is preferably designed as axially slidable in the housing. Particularly preferred is one of the two stator support disks arranged in a fixed position at the housing, ideally the stator support disk located nearest to the rotor winding. In this manner, any wear of the slip rings results in an axial displacement of the housing away from the rotor winding, i.e., in the direction of the free end of the rotor shaft, so that especially in the event of extreme wear a striking of the housing against the adjacent rotor bearing is precluded.

The abutting force with which the adjacent slip rings of the two slip ring pairs are pressed toward each other is preferably supplied by a joint spring arrangement, so that especially the two stator slip rings are prestressed by means of said joint spring arrangement axially against each of the corresponding rotor slip rings. Such a joint spring arrangement has the special advantage that identical prestressing forces are effective in the two slip ring pairs so that essentially identical wear occurs especially in the two slip ring pairs, thus avoiding irregular wear. Said spring arrangement can especially comprise a plurality of compression springs arranged evenly around the rotor axis.

Another preferred embodiment of the invention envisions a discharge terminal installed at the housing which is connected with a discharge contact that is prestressed in an elastic manner against the rotor shaft or a counter contact mounted at the motor shaft. Said discharge terminal can abut the rotor axis at the rotor shaft or the counter contact, respectively, especially on the front side in the area of the rotor axis. In particular, such a discharge terminal prevents the electrostatic charge of the rotor and the problems that can be caused by such an electrostatic charge of the rotor. In this manner it decisively contributes to an additional increase of reliability of the dynamo-electric machine according to the invention.

BRIEF DESCRIPTION OF THE DRAWING

In the following, the current invention is further explained by means of preferred embodiments shown in FIG. 1. FIG. 1 illustrates an axial cross section in the area of interest through a dynamo-electric machine according to the invention in the form of a vehicle generator.

DETAILED DESCRIPTION

The vehicle generator comprises in familiar fashion a rotor 4 which has a rotor shaft 3 and is arranged over a bearing in a stator such that it can be rotated around the axis 2. Said rotor comprises, also in the familiar manner, two pole disks 6 ending in claw poles 5 and, therebetween a rotor winding 7 carrying current with two winding ends 8. Because the vehicle generator corresponds in this design with the adequately well-known state of the art, further explanations are superfluous.

The rotor shaft 3 ends with a shaft journal 9 transecting the bearing 1. In the area of this shaft journal 9, a slip ring arrangement 10 is provided. This comprises two pairs of slip rings, each containing a rotor slip ring 11 and a stator slip ring 12, respectively. The two rotor slip rings 11 are arranged, in this manner, on both sides at opposing front sides of a common rotor support disk 13 that is connected with the rotor shaft 3 in a rotation-proof and axially fixed manner. The rotor support disk 13 forms in this manner a radial protruding collar of a sleeve 14 fixed on the shaft journal 9 and made of an insulating material. The two rotor slip rings 11 made of graphite material are each connected in this manner, via a metal rotor connector disk 15, with the common rotor support disk 13. Each rotor connector disk 15 is connected with a terminal 16 that is oriented essentially parallel to the rotor axis 2 and contacted in the area of an essentially radially oriented end segment 17 via an end clamp 18 with a winding end 8 of the rotor winding 7.

The two stator slip rings 12 are likewise made of a graphite material; the two rotor slip rings 11 are arranged between them. They are assigned to the stator in the sense that they do not rotate. The stator slip ring 12 and the corresponding rotor slip ring 11 are abutting each other permanently in a ring-shaped contact zone 19 that is designed as a truncated cone. The contact zones 19 of the two slip ring pairs are identical with a mirror image orientation toward each other so that the cone tips on which the contact zones 19 rest are directed against each other. The double taper angle of the two contact zones 19 in the form of truncated cones measures approximately 155°.

Each of the two stator slip rings 12 is rigidly connected via a metal stator connector disk 20 with a dedicated stator support disk 21 made of an insulating material. The two stator support disks 21 are located without rotation in a rotation-proof housing 22 surrounding the two slip ring pairs. The housing 22 comprises a jacket segment 23, an outer lid 24 and an inner lid 25 adjacent to the bearing 1. The jacket segment 23 has a slit-like gap 26 where the sliding segments 27 of the stator support disks 27 are guided—for the purpose of torsion prevention of the housing 22 and of the stator support disks 21 relative toward each other. Each of the two sliding segments 27 is permeated by a connector flag 28 which is provided at the corresponding stator connector disk 20.

The two stator slip rings 12 are prestressed via a joint spring arrangement 29 against each dedicated rotor slip ring 11. To this end, the spring arrangement 29 comprises a number of compression springs 30 evenly arranged around the rotor axis 2 and abutting on the one hand the outer lid 24 and on the other hand the adjacent stator support disk 21 shown on the right of the figure. Because the stator support disk 21 (shown at the right) can be axially slid in the housing 22 on the one hand, and on the other hand the housing 22 itself is supported axially on the stator structure, the rotor slip ring 11, of the slip ring pair closest to the bearing 1, shown left in figure, is prestressed against the corresponding stator slip ring 12 by the prestressing force of the compression springs 30. For this purpose, the stator support disk 21 of the left bearing-adjacent slip ring pair is arranged in a fixed position at the housing 22 in the sense that it abuts the inner lid 25.

In the manner described above in detail, the rotor winding 7 is thus connected permanently and electrically conductive without interruption with the non-rotating terminals 31 assigned to the stator.

In addition, a discharge terminal 32 is provided at the housing 22. This comprises a connector segment 34 arranged at the outer lid 24 of the housing 22 and comprising a connector flag 33 on which segment a discharge contact 36 is supported via a prestressing spring 35 which is arranged coaxial to the rotation axis 2. This contact is guided in an axially displaceable manner in a guide sleeve 37 formed into the outer lid 24 of the housing 22 and is prestressed elastically against a counter contact 38 attached to the shaft journal 9 at the end thereof, because of prestressing spring 35. The discharge contact 36 and the counter contact 38 are made of graphite material.

I claim:

1. A dynamo-electric machine, with a stator and rotor assembly (4), the rotor assembly rotatable relative to the stator and comprising a rotor (4) with a rotor shaft (3), the rotor comprising a rotor winding (7) carrying current, wherein the rotor winding is connected in an uninterrupted electrically conductive manner via a slip ring arrangement (10) with terminals (31) assigned to the stator, wherein
   the slip ring arrangement comprises at least two pairs of slip rings,
   each slip ring pair comprises a stator slip ring (12) and a rotor slip ring (11),
   the stator slip ring and the corresponding rotor slip ring of each pair abut each other permanently in a ring-shaped non-cylindrical contact zone (19),
   the two rotor slip rings (11) are arranged between the two stator slip rings (12),
   each rotor slip ring is arranged on a rotor support disk (13) connected rotation-proof with the rotor shaft (3), and
   the two stator slip rings (12) can be moved in axial direction, relative to each other.

2. The dynamo-electric machine of claim 1, wherein the contact zones (19) of the two slip ring pairs are designed in an identical manner and are oriented toward each other as mirror images.

3. The dynamo-electric machine of claim 1, wherein the rotor slip rings (11) are each connected via a metal rotor connector disk (15) with the rotor support disk (13).

4. The dynamo-electric machine of claim 3, wherein a terminal (16) extending essentially parallel to the rotor axis (2) in at least some areas is connected with each rotor connector disk (15).

5. The dynamo-electric machine of claim 4, wherein the rotor winding (7) is contacted with end clamps (18) with the terminals (16).

6. The dynamo-electric machine of claim 1, wherein a joint rotor support disk (13) is provided at which the two rotor slip rings (11) are arranged on both sides at opposite front sides.

7. The dynamo-electric machine of claim 1, wherein at least one of the rotor slip rings (11) and the stator slip rings (12) are made of graphite material.

8. The dynamo-electric machine of claim 7, wherein the rotor slip rings (11) and the stator slip rings (12) are made of different graphite material.

9. The dynamo-electric machine of claim 1, wherein the contact zones (19) are wetted because at least one of the rotor slip rings and the stator slip rings are immersed in a wetting fluid.

10. The dynamo-electric machine of claim 1, wherein each stator slip ring (12) is rigidly connected with a corresponding stator support disk (21) located in a housing (22) surrounding the slip ring arrangement (10).

11. The dynamo-electric machine of claim 10, wherein the stator slip rings (12) are connected with the corresponding stator support disk (21) via a metal stator connector disk (20) with a terminal (31) each.

12. The dynamo-electric machine of claim 10, wherein at least one of the stator support disks (21) can be axially slid in the housing (22).

13. The dynamo-electric machine of claim 10, wherein one stator support disk (21) is arranged in a rigid manner at the housing (22).

14. The dynamo-electric machine of claim 13, wherein the two stator slip rings (12) are prestressed by means of a joint spring arrangement (29) axially against each of the corresponding rotor slip rings (11).

15. The dynamo-electric machine of claim 14, wherein the spring arrangement (29) comprises a plurality of compression springs (30) arranged around the rotor axis (2) in a uniform distribution.

16. The dynamo-electric machine of claim 1, wherein a discharge connector (32) is attached at the housing (22); said discharge connector (32) is connected to a discharge contact (36) that is prestressed in an elastic manner against the rotor shaft (3) or a counter contact (38) attached to the rotor shaft.

17. The dynamo-electric machine of claim 16, wherein the discharge contact (36) frontally abuts the rotor shaft (3) or the counter contact (38), respectively, in the area of the rotor axis (2).

* * * * *